US008725495B2

(12) United States Patent
Peng et al.

(10) Patent No.: US 8,725,495 B2
(45) Date of Patent: May 13, 2014

(54) SYSTEMS, METHODS AND DEVICES FOR GENERATING AN ADJECTIVE SENTIMENT DICTIONARY FOR SOCIAL MEDIA SENTIMENT ANALYSIS

(75) Inventors: Wei Peng, Sunnyvale, CA (US); Dae Hoon Park, Champaign, IL (US)

(73) Assignee: Xerox Corporation, Norwalk, CT (US)

( * ) Notice: Subject to any disclaimer, the term of this patent is extended or adjusted under 35 U.S.C. 154(b) by 418 days.

(21) Appl. No.: 13/082,963

(22) Filed: Apr. 8, 2011

(65) Prior Publication Data

US 2012/0259616 A1     Oct. 11, 2012

(51) Int. Cl.
  *G06F 17/20*   (2006.01)
  *G06F 17/27*   (2006.01)

(52) U.S. Cl.
  USPC ......................................... 704/9; 704/1

(58) Field of Classification Search
  USPC .......................... 704/9, 1; 707/722
  See application file for complete search history.

(56) References Cited

U.S. PATENT DOCUMENTS

| | | | | |
|---|---|---|---|---|
| 6,070,134 A * | 5/2000 | Richardson et al. | ............... | 704/9 |
| 6,199,034 B1 * | 3/2001 | Wical | ............... | 704/9 |
| 7,475,007 B2 * | 1/2009 | Kanayama et al. | ............... | 704/9 |
| 7,996,210 B2 * | 8/2011 | Godbole et al. | ............... | 704/9 |
| 8,046,348 B1 * | 10/2011 | Rehling et al. | ............... | 707/708 |
| 8,055,608 B1 * | 11/2011 | Rehling et al. | ............... | 707/765 |
| 8,136,034 B2 * | 3/2012 | Stanton et al. | ............... | 715/255 |
| 8,326,603 B1 * | 12/2012 | Budzinski | ............... | 704/9 |
| 8,352,405 B2 * | 1/2013 | Fang et al. | ............... | 706/50 |
| 8,442,810 B2 * | 5/2013 | Anisimovich et al. | ............ | 704/2 |
| 2008/0249764 A1 * | 10/2008 | Huang et al. | ............... | 704/9 |
| 2009/0193328 A1 * | 7/2009 | Reis et al. | ............... | 715/231 |
| 2010/0153219 A1 * | 6/2010 | Mei et al. | ............... | 705/14.73 |
| 2011/0225174 A1 * | 9/2011 | Artzt et al. | ............... | 707/750 |
| 2011/0270603 A1 * | 11/2011 | Ovil et al. | ............... | 704/9 |
| 2012/0254063 A1 * | 10/2012 | Ritterman et al. | .......... | 705/36 R |

OTHER PUBLICATIONS

Minqing Hu and Bing Liu. 2004. Mining and summarizing customer reviews. In Proceedings of the tenth ACM SIGKDD international conference on Knowledge discovery and data mining (KDD '04).*
Dongjoo Lee, Ok-Ran Jeong, and Sang-goo Lee. 2008. Opinion mining of customer feedback data on the web. In Proceedings of the 2nd international conference on Ubiquitous information management and communication (ICUIMC '08). ACM, New York, NY, USA, 230-235.*

(Continued)

*Primary Examiner* — Pierre-Louis Desir
*Assistant Examiner* — Matthew Baker
(74) *Attorney, Agent, or Firm* — MH2 Technology Law Group LLP

(57) ABSTRACT

Embodiments generally relate to systems and methods for generating a sentiment dictionary and calculating sentiment scores of adjectives within the sentiment dictionary. A set of seed words can be identified and expanded using synonyms and antonyms of the set of seed words. Social media data can be parse to identify adjectives that link to the set of seed words with the words "and" or "but." Matrices representing the attraction and repulsion among the linked adjectives can be generated. A factorization algorithm can be minimized to determine an output matrix that comprises positive and negative sentiment scores for each of the adjectives. In embodiments, a sentiment score for part of all of the social media data can be calculated using the output matrix, and one or more parts of the social media data can be classified as a positive or negative sentiment.

20 Claims, 6 Drawing Sheets

(56) References Cited

OTHER PUBLICATIONS

Hatzivassiloglou, V. and McKeown, K. R. 1997. Predicting the semantic orientation of adjectives. In Proceedings of the Eighth Conference on European Chapter of the Association for Computational Linguistics (Madrid, Spain, Jul. 7-12, 1997). European Chapter Meeting of the ACL. Association for Computational Linguistics, Morristown, NJ, 174-181.*

Colbaugh, R.; Glass, K., "Estimating sentiment orientation in social media for intelligence monitoring and analysis," Intelligence and Security Informatics (ISI), 2010 IEEE International Conference on, vol., No., pp. 135,137, 23-26 May 20.*

Soo-Min Kim and Eduard Hovy. 2004. Determining the sentiment of opinions. In Proceedings of the 20th international conference on Computational Linguistics (COLING '04). Association for Computational Linguistics, Stroudsburg, PA, USA, , Article 1367.*

Dingding Wang, Tao Li, Shenghuo Zhu, and Chris Ding. 2008. Multi-document summarization via sentence-level semantic analysis and symmetric matrix factorization. In Proceedings of the 31st annual international ACM SIGIR conference on Research and development in information retrieval (SIGIR '08). ACM, New York, NY, USA, 307-314.*

Bo Pang, Lillian Lee, and Shivakumar Vaithyanathan. 2002. Thumbs up?: sentiment classification using machine learning techniques. In Proceedings of the ACL-02 conference on Empirical methods in natural language processing—vol. 10 (EMNLP '02), vol. 10. Association for Computational Linguistics, Stroudsburg, PA, USA, 79-86.*

Andrea Esuli and Fabrizio Sebastiani. 2005. Determining the semantic orientation of terms through gloss classification. In Proceedings of the 14th ACM international conference on Information and knowledge management (CIKM '05). ACM, New York, NY, USA, 617-624.*

J. Kamps, M. Marx, R. J. Mokken, and M. de Rijke, "Using WordNet to measure semantic orientation of adjectives," in Proceedings of LREC, 2004.*

\* cited by examiner

SYSTEMS, METHODS AND DEVICES FOR GENERATING AN ADJECTIVE SENTIMENT DICTIONARY FOR SOCIAL MEDIA SENTIMENT ANALYSIS

FIELD OF THE INVENTION

This invention relates generally to sentiment analysis, and more particularly, to systems, methods and devices for generating an adjective sentiment dictionary for use in a sentiment analysis of social media data.

BACKGROUND OF THE INVENTION

Sentiment analysis typically involves the application of natural language processing and/or text analytics to determine an overall tone of some form of text. In particular, sentiment analysis can be used to gauge the attitude of a speaker or writer of the text. In aspects, the sentiment analysis can classify the polarity of a given text, or whether the text is positive, negative, or neutral. The accuracy of a sentiment analysis can be how well the sentiment analysis agrees with human judgments.

Sentiment analysis on social media from sources such as weblogs, websites, social networking sites, bulletin boards, content aggregators, and other outlets can prove difficult because of low accuracies that result from informal writing prevalent in social media data. Current sentiment analysis tools used on media employ a lexicon-based approach instead of a machine learning approach because the machine learning approach requires the challenge of obtaining enough human-labeled training data for large-scale and diverse social opinion data. In the lexicon-based approach, a sentiment dictionary is used to determine opinion polarity, and can provide useful features for a supervised learning method of the machine learning approach. However, existing sentiment dictionaries do not cover the numerous informal and spoken words used in social media, which can result in low recall. In addition, the existing sentiment dictionaries are not able to update frequently to include newly generated words.

Therefore, it may be desirable to have systems and methods for automatic sentiment dictionary generation. In particular, it may be desirable to have systems and methods using adjective seed words, thesauruses, and conjunction relationships to build sentiment dictionaries and establish polarity scores for words in the sentiment dictionaries.

SUMMARY

An embodiment generally relates to a method of processing data. The method comprises identifying a set of seed words comprising words defined as either positive words or negative words. Further, the method comprises extracting, from a set of data, adjectives linked to the set of seed words with "and", and extracting, from the set of data, adjectives linked to the set of seed words with "but". Still further, the method comprises determining a first value indicating a first frequency with which the adjectives are linked to the set of seed words with "and", determining a second value indicating a second frequency with which the adjectives are linked to the set of seed words with "but", and calculating, by a processor, sentiment scores for each adjective of the set of data based on the first value and the second value.

Another embodiment pertains generally to a system for processing data. The system comprises an interface to a storage device configured to store a set of data. The system further comprises a processor that is configured to identify a set of seed words comprising words defined as either positive words or negative words, extract, from the set of data, adjectives linked to the set of seed words with "and", extract, from the set of data, adjectives linked to the set of seed words with "but", determine a first value indicating a first frequency with which the adjectives are linked to the set of seed words with "and", determine a second value indicating a second frequency with which the adjectives are linked to the set of seed words with "but"; and calculate, by a processor, sentiment scores for each adjective of the set of data based on the first value and the second value.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
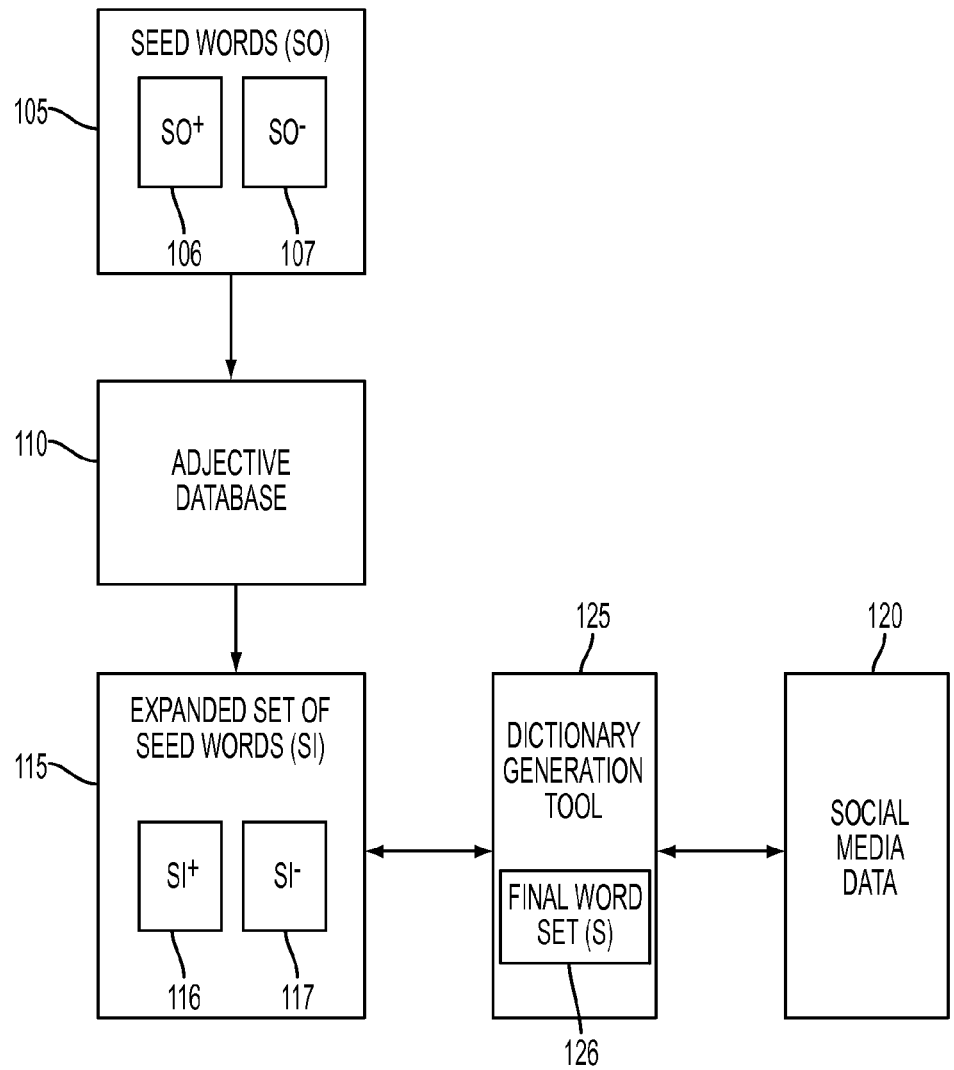
FIG. 1 illustrates exemplary embodiment for systems and methods for generating words for a sentiment dictionary, according to various embodiments

For simplicity and illustrative purposes, the principles of the present teachings are described by referring mainly to exemplary embodiments thereof. However, one of ordinary skill in the art would readily recognize that the same principles are equally applicable to, and can be implemented in, all types of analysis systems, and that any such variations do not depart from the true spirit and scope of the present invention. Moreover, in the following detailed description, references are made to the accompanying figures, which illustrate specific embodiments. Electrical, mechanical, logical and structural changes can be made to the embodiments without departing from the spirit and scope of the present invention. The following detailed description is, therefore, not to be taken in a limiting sense and the scope of the present invention is defined by the appended claims and their equivalents.

Embodiments generally relate to systems and methods for automatic sentiment dictionary generation. In particular, the embodiments relate to platforms and techniques for using adjective seed words and antonym constraints to build sentiment dictionaries and establish polarity scores for words in the sentiment dictionaries. In embodiments, the dictionary is generated by combining WordNet® or other lexical databases with social network data, such as content from Digg.com and/or other sources. In embodiments, a factorization algorithm can be used to generate positive and negative polarity scores for the adjectives of the dictionary.

As used herein, the term "social media data" can refer to any data accessed or collected from weblogs, microblogs, websites, social networking sites, bulletin boards, content aggregators, and other sources, in the form of articles, comments, status updates, and other data. A sentiment analysis can be more difficult on social media data than normal, standard, or formalized opinion data because the probability of human agreement on both word-level sentiment and comment-level sentiment from social media data is much lower than that from normal, standard, or formalized opinion data reported from literature, research, journals, newspapers, magazines, and other similar sources. For example, the adjective "sick" can be viewed to have a different meaning when used in social media versus normal media. In particular, the adjective "sick" in the context of normal media can refer to an unhealthy state of, for example, an individual, and can generally have a negative connotation or polarity. In contrast, the adjective "sick" in the context of social media can describe something that is impressive or exemplary, and can generally have a positive connotation or polarity.

In present embodiments, an algorithm referred to as constrained symmetric nonnegative matrix factorization (CS-NMF) can be used to cluster word nodes connected by various relations and constraints into positive and negative classes. In evaluations, use of the CSNMF algorithm in combining links from WordNet® and the social media corpus to generate sentiment dictionaries outperformed other ground-truth dictionaries. Further, the CSNMF factorization can output sentiment or polarity strength scores for each word in the generated dictionary, whereby evaluations showed that the top ranked words yield better precisions. In embodiments, the sentiment scores for the words can be used to determine sentiment scores for comments or the like in social network articles.

FIG. 1 illustrates an exemplary embodiment for systems and methods for generating words for a sentiment dictionary, according to various embodiments. More particularly, the systems and methods can identify, access, or extract candidate words for a sentiment dictionary and construct input matrices for generating the sentiment dictionary. As shown in FIG. 1, a set of seed words S0 105 comprising a positive set S0+ 106 and a negative set S0− 107 of adjectives can be identified or generated. In embodiments, the positive set S0+ 106 can comprise adjectives that generally or unequivocally comprise a positive connotation such as, for example, "wonderful," "remarkable," "sensational," and other terms. Further, the negative set S0− 107 can comprise adjectives that generally or unequivocally comprise a negative connotation such as, for example, "unhealthy," "inappropriate," "lousy," and other terms. It should be appreciated that the set of seed words S0 105 can be identified or generated in any way such as, for example, manual input, extraction from an existing list, and other generation channels. In embodiments, the set of seed words S0 105 can comprise a limited or set number of words.

The set of seed words S0 105 can be expanded by adding synonyms and antonyms of the set of seed words S0 105. As shown in FIG. 1, the set of seed words S0 105 can be expanded to an expanded word set S1 115 via an adjective database 110 such as the WordNet® database or other databases, and/or other inputs. In embodiments, the adjective database 110 can comprise synonyms and antonyms for the set of seed words S0 105, and other adjectives. The expanded positive word set can be designated as S1+ 116, and can comprise the positive set S0+ 106, the synonyms of S0+ 106, and the antonyms of S0− 107. Further, the expanded negative word set can be designated as S1− 117, and can comprise the negative set S0− 107, the synonyms of S0− 107, and the antonyms of S0+ 106. In embodiments, more words can be added to the expanded word set S1 115 by further crawling through more levels of synonyms and antonyms in the adjective database 110 or other databases. In embodiments, given the expanded word set S1 115, the number of times that a word i and a word j of the expanded word set S1 115 appear to be synonyms can be denoted as $w_{ij}^+$ and the number of times that the word i and the word j of the expanded word set S1 115 appear to be antonyms can be denoted as $w_{ij}^-$.

In embodiments, social media data 120 can be gathered, collected, or otherwise identified, in any way, from any source. A dictionary generation tool 125 or other logic can parse the social media data 120 using, for example, a part-of-speech (POS) technique to identify and extract pairs of adjectives in the social media data 120 that are linked with "and" or "but." Embodiments can specify that the adjectives of the pairs must be immediately preceding and subsequent to the "and" or the 'but,' or that the adjectives of the pairs can have other words between them and the "and" or the "but." The dictionary generation tool 125 can examine the expanded word set S1 115 to identify adjectives linked to the pairs of adjectives parsed from the social media data 120. In embodiments, the identified adjectives of the parsed social media data 120 and the expanded word set S1 115 can be added to the expanded word set S1 115 to generate a final word set S 126. Further, more words can be added to the final word set S 126 by including words that are multiple levels or hops away from the words in the expanded word set S1 115. In embodiments, words that are at most three (3) levels away from the words in the expanded word set S1 115 can be added to the final word set S 126. In embodiments, the frequency of the word i and the word j of the final word set S 126 being linked with "and" can be denoted as $d_{ij}^+$ and the frequency of the word i and the word j of the final word set S 126 being linked with "but" can be denoted as $d_{ij}^-$.

In embodiments, two input matrices or other forms of input can be used in the generation of the positive and negative polarity scores for the adjectives. In particular, a graph matrix X can be a matrix in which each entry value is the edge weight between two adjectives calculated from the synonym relation ($w_{ij}^+$) and the "and" conjunction relation ($d_{ij}^+$), as discussed above. Further, the constraint matrix C can be a matrix in which each non-zero entry value denotes a cannot-link weight between two adjectives calculated from an adjectives presence in the set of seed words S0 105 and the "but" conjunction relation ($d_{ij}^-$), as discussed above. In embodiments, both the graph matrix X and the constraint matrix C can be nonnegative symmetric matrices with the same cardinality.

The entries of the graph matrix X can represent "attractions" between the words of the final word set S 126. In embodiments, the entries $x_{ij}$ of the graph matrix X can indicate the graph edge weight between the word i and the word j. Further, the entries $x_{ij}$ of the graph matrix X can be formulated as:

$$x_{ij} = w_{ij}^+ + \text{Log}(d_{ij}^+ + 1) \quad (1)$$

The entries of the graph matrix C can represent "repulsions" between the words of the final word set S. In embodiments, the entries of the graph matrix C can be formulated as:

$$c_{ij} = I_{ij} + \text{Log}(d_{ij}^- + 1) \quad (2)$$

In (2), $I_{ij}$ can be equal to 1 if word i is in S0+ 106 and word j is in S0− 107, or vice versa. Otherwise, $I_{ij}$ can be equal to 0.

In embodiments, a nonnegative matrix factorization (NMF) can be used in pattern recognition and dimensionality reduction. In particular, the NMF can perform singular value decomposition with nonnegative constraints. An NMF fitting algorithm can minimize the Euclidean distance (e.g. the least square error) or DL-divergence (I-divergence) between an original matrix and a reconstructed matrix by, for example, using multiplicative update rules to ensure the nonnegativity. NMF can be useful for clustering during experiments on documents collections and other data. A benefit of having the entries of the input matrices and the output component matrices being nonnegative is that the solutions can be easy to interpret, and a clustering quality may not degraded due to additional approximation in a discretization process.

In present embodiments, a constrained symmetric nonnegative matrix factorization (CSNMF) algorithm can be used to perform a sentiment analysis on the adjectives of the final word set S 126. The CSNMF algorithm can extend NMF techniques by adding constraints on graph nodes, and iteratively cutting the graph of adjectives into positive and negative sets, wherein each adjective word can be assigned a positive score and a negative score. In embodiments, the objective function of CSNMF to be minimized can be formulated as:

$$J_{CSNMF} = \|X - HSH^T\|_F^2 + \alpha Tr(H^T CH), \quad (3)$$

where $X \in R^{n \times n}$, $C \in R^{n \times n}$, and $\alpha$ are the inputs. More particularly, X is the nonnegative symmetric graph matrix as formulated by equation (1), and C is the constraint weighing matrix as formulated by equation (2). Further, $\alpha$ is an input parameter that can adjust the influence on the penalty term $Tr(H^T CH)$. The outputs of equation (3) are $H \in R^{n \times k}$ and $S \in R^{k \times k}$. More particularly, H is a class indicator matrix where $h_{ij}$ can be seen as a "weight" or "load" of the object "i" in class "l." Further, the matrix H can indicate the probability of the word "i" belonging to sentiment class "l". Thus, the matrix H can provide sentiment scores comprising the positive score and negative score for each word. In embodiments, the matrix H can be used to generate or calculate sentiment scores for part of all of the social media data. For example, the dictionary generation tool 125 or other logic can calculate a sentiment score for comments to an article on a website, or other data, using the matrix H. The matrix S can provide extra degrees of freedom that allow the matrix H to be closer to the form of cluster indicators.

In embodiments, the output matrices, H and S, can be constrained to have positive entries. In addition, the objective function of equation (3) can be minimized using a nonnegative multiplicative least square update algorithm, in which one component can be updated with other components are fixed. In embodiments, the matrix S can be initialized with random nonnegative entries and larger values on the diagonal. Further, because the polarity of the set of seed words S0 105 are known, H can be initialized such that $h_{i1} = 1$ and $h_{i2} = \sigma$ if word $i \in S0^+$, where $\sigma \ll 1$. Similarly, H can additionally be initialized such that $h_{i2} = 1$ and $h_{i1} = \sigma$ if word $i \in S0^-$. Next, H can be updated while fixing S using the nonnegative multiplicative least square algorithm:

$$h_{ij} = h_{ij} \frac{(XHS)_{ij}}{(HSH^T HS + \alpha CH)_{ij}} \quad (4)$$

Further, S can be updated while fixing H using the following algorithm:

$$s_{ij} = s_{ij} \frac{(H^T XH)_{ij}}{(H^T HSH^T H)_{ij}} \quad (5)$$

In embodiments, equations (4) and (5) can be updated iteratively until convergence.

Experiments were performed on gathered data sets. In particular, two data sets were gathered from the website Digg.com: a 9-month data set ("Digg9") of comments and replies from posted stories, and a 6-month data set ("Digg6") of comments and replies from posted stories. The Digg9 set contained 50241 "and" pairs of adjectives and 1328 "but" pairs of adjectives, and the Digg6 set contained 19241 "and" pairs of adjectives and 509 "but" pairs of adjectives. The seed word set used in the experiment contained 27 "positive" words and 25 "negative" words.

Figure 2:
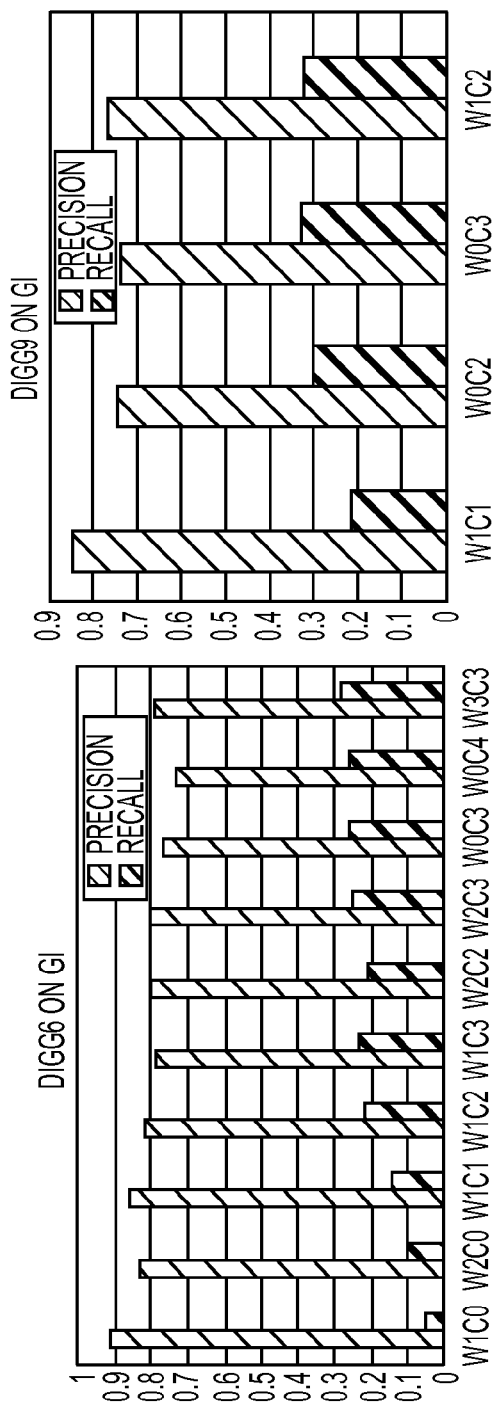
FIG. 2 illustrates charts of experimental results conducted according to various embodiments.

Different dictionaries were generated under various level settings on both WordNet® and conjunction links in the Digg6 and Digg9 data sets. FIG. 2 shows the experimental results of the generated dictionaries evaluated against a general inquirer (GI) dictionary. As shown in FIG. 2, each column indicates a level setting for the corresponding dataset. For example, "W1C0" corresponds to a dictionary that was generated by extending the seed word set one level on WordNet®, and with no expansion on conjunction links from the Digg data. For further example, "W1C1" corresponds to a dictionary that was generated by expanding the seed words one level on WordNet® and one level on conjunction links from the Digg data. The data in FIG. 2 indicates that the more levels the seed words are expanded, the less the precision and the higher the recall. Further, the expansion on WordNet® without the assistance from conjunction links from the Digg data (e.g. W2C0 compared to W1C1 from Digg6) can yield a lower precision and a lower recall. Still further, the expansion on conjunction links from the Digg data produces dictionaries with lower precisions and lower recalls compared to dictionaries by expanding on both WordNet® and the Digg data (e.g. W0C3 and W0C4 compared to W3C3 from Digg6, and W0C2 and W0C3 compared to W1C2 from Digg9).

As discussed herein, each word of the generated dictionary can have an associated sentiment or polarity score from the output matrix H. Further, the words can be ranked based on the sentiment scores. The experiments indicated that the top ranked words had higher confidence to be assigned to their sentiment scores. For example, the top ranked 1000 words W3C3 from Digg6 have 91.33% precision and 12.33% recall, the top ranked 2000 words from Digg6 have 86.87% precision and 17.94% recall, and the top ranked 3000 words from Digg6 have 83.62% precision and 22.57% recall.

The CSNMF dictionary generation algorithm was used on the Digg6 data set and compared to three (3) "ground-truth" dictionaries for verification. In particular, a "strict" and a "generous" dictionary were generated in the Amazon Mechanical Turk (AMT) crowdsourcing marketplace, and an additional dictionary was generated according to the general inquirer (GI) approach. In the AMT marketplace, three (3) humans were used to label each word of the Digg6 data set as "positive," "negative," or "neutral." The word sentiment labels were merged by a strict or generous policy to respectively generate the "strict" and "generous" dictionaries. With the strict policy, a target word obtained a sentiment label only when all three annotators agreed, and "no label" represents words in which at least one annotator did not agree. With the generous policy, agreement by only a majority of annotators (at least two) is required, and a "no label" represents words in which all three annotators gave different polarity labels. The results of the evaluation indicated that the CSNMF dictionary had a 84.51% precision with the AMT "strict" dictionary, a 78.14% precision with the AMT "generous" dictionary, and a 81.18% precision with the GI dictionary.

Figure 3:
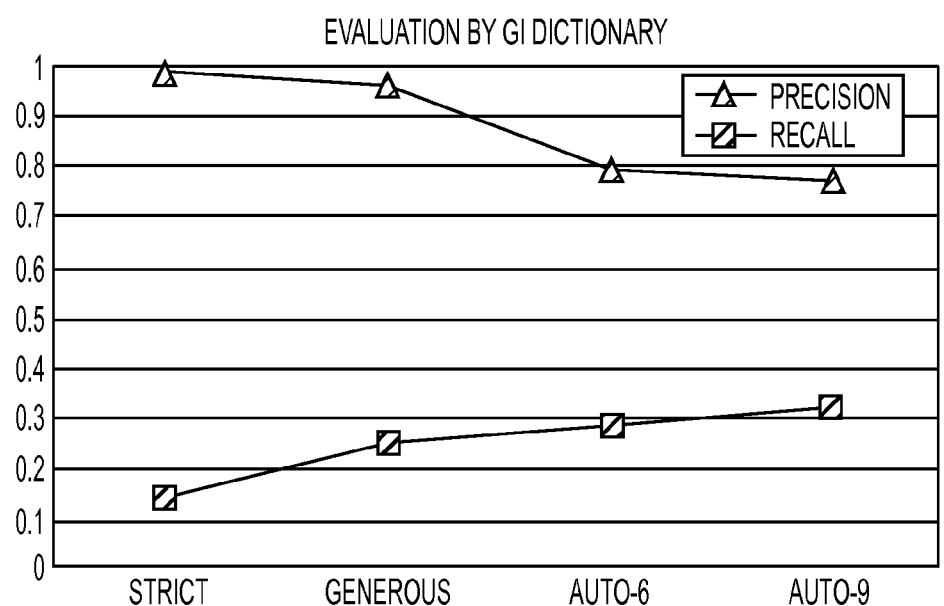
FIG. 3 illustrates a chart of experimental results conducted according to various embodiments.

To ensure that the words of the generated dictionary were correctly labeled, a comparison of the words was conducted using the AMT marketplace. In particular, word labels from AMT were evaluated by GI, with the result shown in FIG. 3. As shown in FIG. 3, the "Strict" and "Generous" labels on the x-axis correspond to labels created on AMT according to the "strict" and "generous" policies, respectively. Further, the "Auto-6" and "Auto-9" labels on the x-axis correspond to terms from a W3C3 generation from Digg6 and a W1C2 generation from Digg 9, respectively. As shown in FIG. 3, the "Strict" and "Generous" policies achieved fairly high precisions, implying that the labels from AMT should not contain much noise. Further, the "Auto-6" and "Auto-9" achieved high recall without degrading the precision and, because of this, the W3C3 dictionary from Digg6 and the W1C2 dictionary from Digg9 were combined to form a "union dictionary" for further evaluation.

In particular, the 7221 adjectives of the union dictionary were posted on AMT, and all of the words labeled with a "neutral" were omitted for evaluation by AMT. The accuracy of the automatically generated dictionary was then measured by the equation:

$$\text{Dictionary Accuracy} = \frac{\text{\# true positive} + \text{\# true negative}}{\text{\# positive} + \text{\# negative}} \quad (6)$$

Figure 4A:
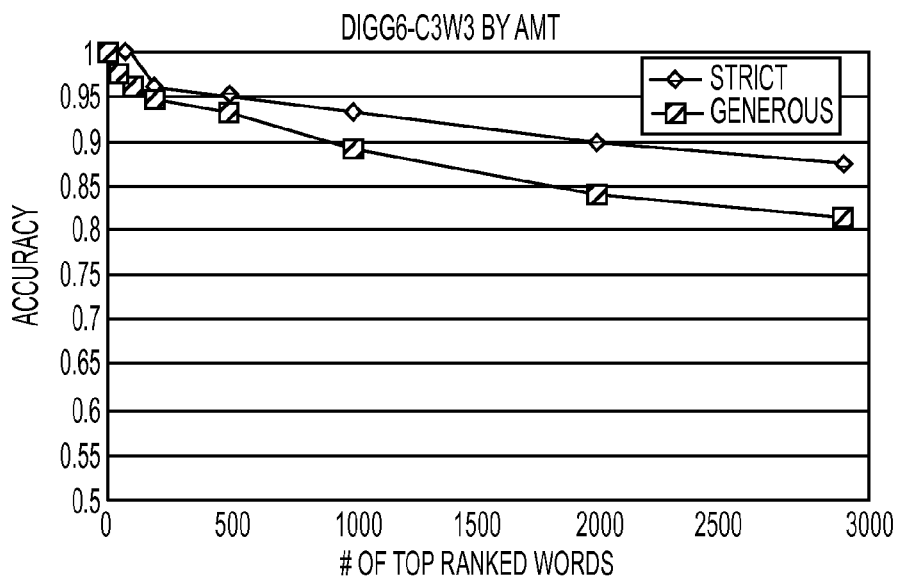
FIG. 4 illustrates charts of experimental results conducted according to various embodiments.
Figure 4B:
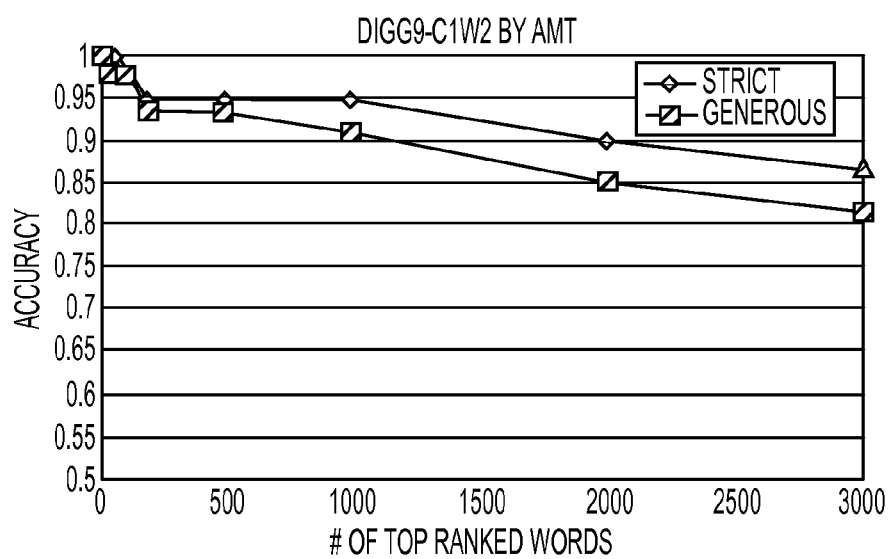

In particular, the dictionary accuracy is the number of correctly classified positive and negative words divided by the number of all positive and negative words. The accuracies of C3W3 from Digg 6 and C1W2 from Digg9 are shown in FIGS. 4a and 4b, respectively. In particular, the x-axis indicates the number of top ranked words in the dictionary that were extracted for evaluation, and the y-axis is the dictionary accuracy ranging from 0 to 1. The results of FIGS. 4a and 4b indicate that the accuracy of the dictionary evaluated by AMT labels with a "strict" policy is always above that with a "generous" policy because the "strict" AMT labels have less noise or mislabels. Further, the accuracy decreases as the number of top ranked words increases, indicating that the sentiment scores generated by the CSNMF algorithm do reflect the "true" scores. More particularly, the higher score a word receives, the higher sentiment strength it has to make to verify its label. Therefore, the words with higher sentiment scores have higher probabilities to be correctly labeled. Still further, the accuracy values of C3W3 from Digg6 and C1W2 from Digg9 are almost equal when the number of extracted top ranked words is the same. Although the edge values and the constraint values are different for a given pair of adjectives, the overall distribution of edge and constraint weights should be very similar.

Figure 5:
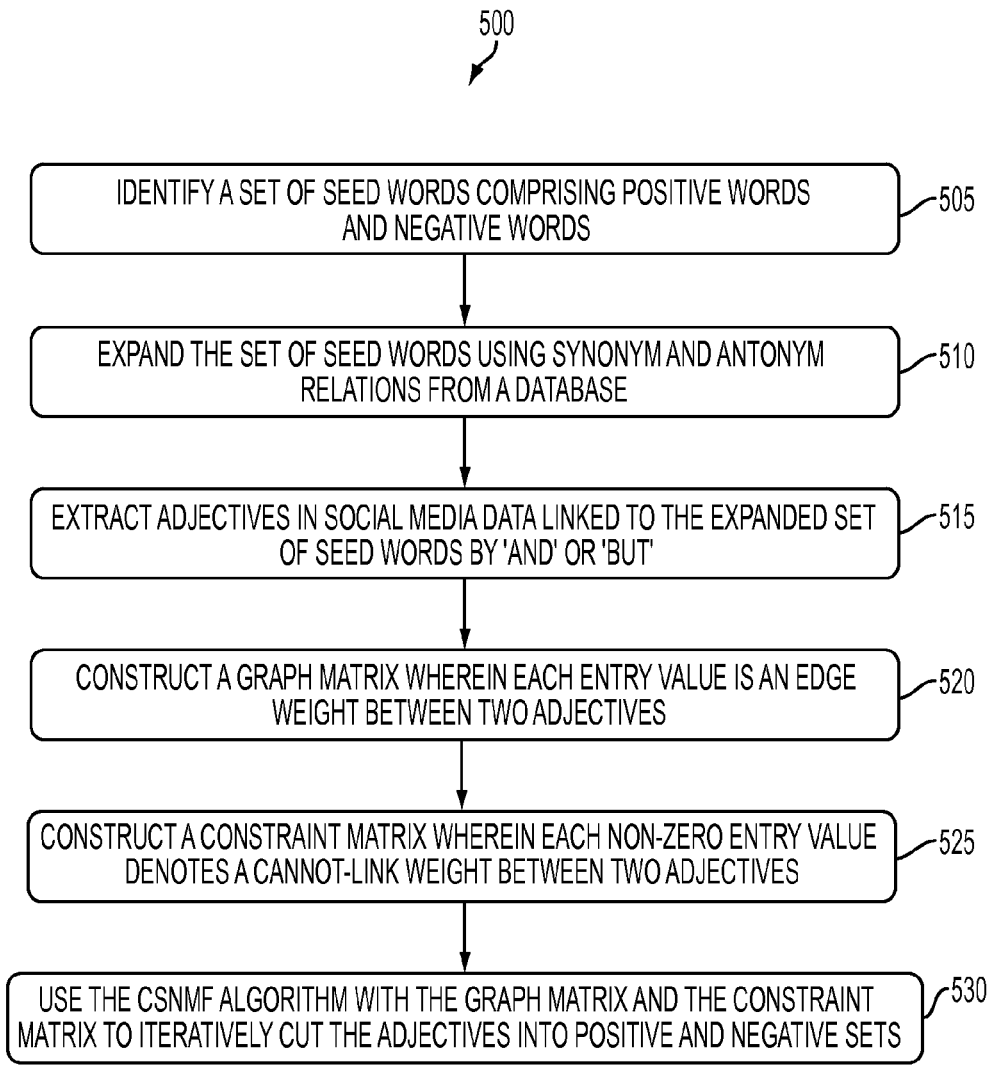
FIG. 5 illustrates an exemplary flow diagram implemented according to various embodiments.

FIG. 5 illustrates an exemplary flow diagram 500 that can be used in systems and methods for generating an adjective sentiment dictionary. It should be readily apparent to those of ordinary skill in the art that the flow diagram 500 depicted in FIG. 5 represents a generalized illustration and that other steps can be added or existing steps can be removed or modified.

As shown in FIG. 5, in 505, a set of seed words comprising positive words and negative words can be identified. In embodiments, the positive words can have a generally-accepted positive connotation and the negative words can have a generally-accepted negative connotation. In 510, the set of seed words can be expanded using synonym and antonym relations from a database. In embodiments, the database can be the WordNet® database. In 515, adjectives present in social media data and linked to the expanded set of seed words by "and" or "but" can be extracted. In embodiments, the adjectives can be extracted using a Part-Of-Speech (POS) technique.

In 520, a graph matrix can be constructed whereby each entry value is an edge weight between two adjectives. In embodiments, the graph matrix can be calculated using the synonym relations of the database and the "and" conjunction link data. In 525, a constraint matrix can be constructed whereby each non-zero entry value can denote a cannot-link weight between two adjectives. In embodiments, the constraint matrix can be calculated using the antonym relations of the database and the "but" conjunction link data. In 530, the CSNMF algorithm can be used with the graph matrix and the constraint matrix to iteratively cut the adjectives into positive and negative sets. In embodiments, each adjective can be assigned a positive score and a negative score. In further embodiments, the adjectives can be classified as either positive or negative based on the positive and negative scores.

Figure 6:
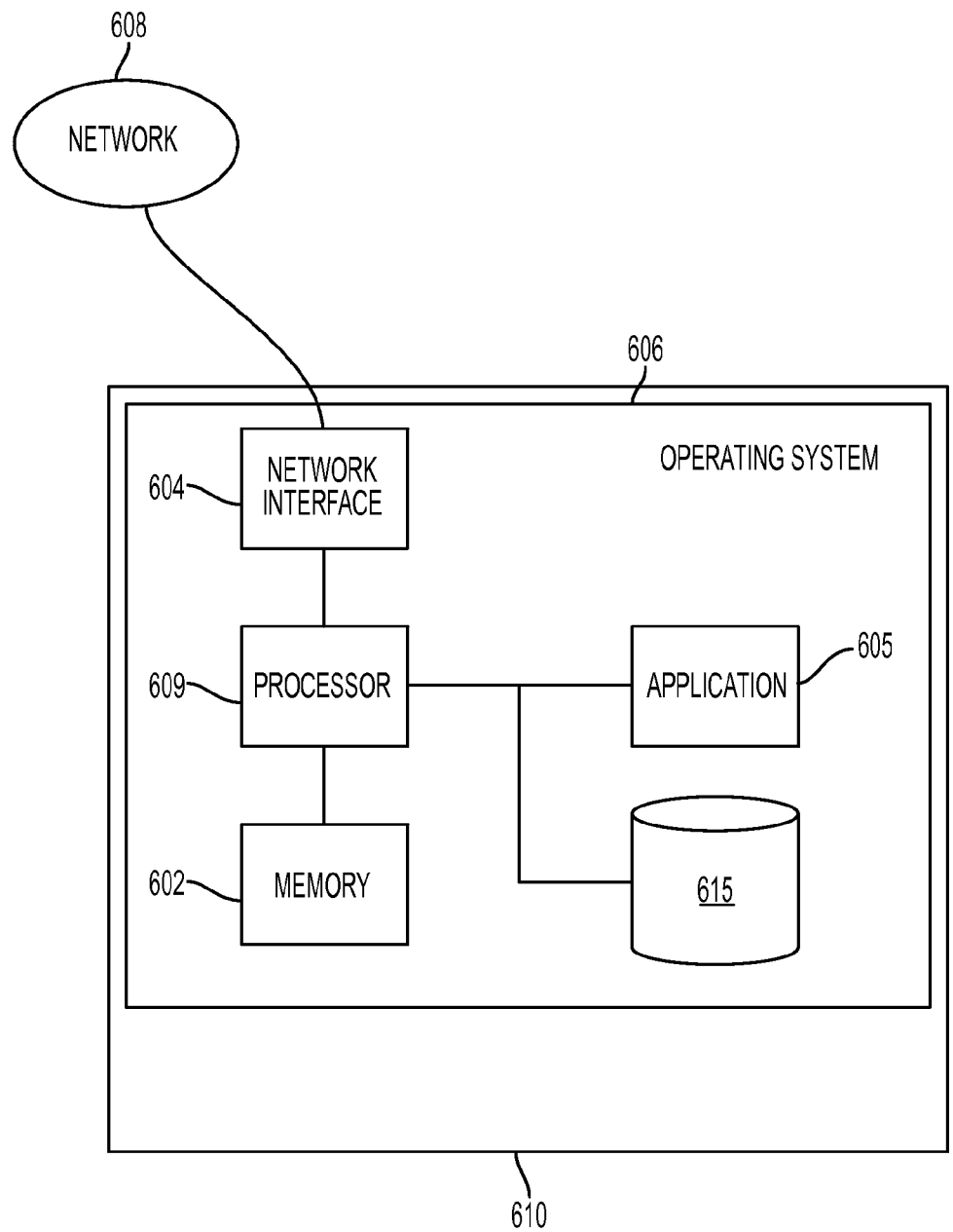
FIG. 6 illustrates a hardware diagram in accordance with another embodiment.

FIG. 6 illustrates an exemplary diagram of hardware and other resources that can be incorporated with the dictionary generation tool 125. As shown in FIG. 6, a server 610 can be configured to communicate with a network 608. In embodiments as shown, the server 610 can comprise a processor 609 communicating with memory 602, such as electronic random access memory, or other forms of transitory or non-transitory computer readable storage mediums, operating under control of or in conjunction with an operating system 606. The operating system 606 can be any commercial, open-source, or proprietary operating system or platform. The processor 609 can communicate with a database 615, such as a database stored on a local hard drive. While illustrated as a local database in the server 610, the database 615 can be separate from the server 610.

The processor 609 can further communicate with a network interface 604, such as an Ethernet or wireless data connection, which in turn communicates with the network 608, such as the Internet or other public or private networks. The processor 609 can also communicate with the database 615 or any applications 605, such as the dictionary generation tool 125, to execute control logic and perform the dictionary generation and sentiment analyses described herein.

While FIG. 6 illustrates the server 610 as a standalone system comprising a combination of hardware and software, the server 610 can also be implemented as a software application or program capable of being executed by a conventional computer platform. For example, it should be understood that the components of the server 610 can be implemented on user PCs or other hardware such that the user PCs can communicate directly with the database 615. Likewise, the server 610 can also be implemented as a software module or program module capable of being incorporated in other software applications and programs. In either case, the server 610 can be implemented in any type of conventional proprietary or open-source computer language.

Certain embodiments can be performed as a computer program. The computer program can exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of processing data, the method comprising:
   identifying a set of seed words comprising words defined as either positive words or negative words;
   extracting, from a set of data, adjectives linked to the set of seed words with "and";
   extracting, from the set of data, adjectives linked to the set of seed words with "but";
   determining a first value indicating a first frequency with which the adjectives are linked to the set of seed words with "and";
   determining a second value indicating a second frequency with which the adjectives are linked to the set of seed words with "but";
   calculating a synonym score using an equation $x_{ij}=w_{ij}^{+}+\mathrm{Log}(d_{ij}^{+}+1)$, wherein $x_{ij}$ corresponds to the synonym score, $w_{ij}^{+}$ corresponds to a number of times that a word i and a word j appear to be synonyms, and $d_{ij}^{+}$ corresponds to the first equency; and
   calculating, by a processor, sentiment scores for each adjective of the set of data based on the synonym score and an antonym score calculated using the second value.

2. The method of claim 1, wherein identifying the set of seed words comprises:
   identifying the set of seed words; and
   generating an expanded set of seed words by adding synonyms and antonyms of the set of seed words to the set of seed words.

3. The method of claim 1, wherein the set of seed words comprises a positive set and a negative set.

4. The method of claim 1, wherein each of the sentiment scores comprises a positive sentiment score and a negative sentiment score.

5. The method of claim 1, further comprising calculating the antonym score using an equation $c_{ij}=I_{ij}+\mathrm{Log}(d_{ij}^{-}+1)$, wherein $c_{ij}$ corresponds to the antonym score, $I_{ij}$ equals 1 if the word i is in a positive set of the set of seed words and the word j is in a negative set of the set of seed words, or vice versa, and equals 0 otherwise, and $d_{ij}^{-}$ corresponds to the second frequency of.

6. The method of claim 5, wherein the sentiment scores can be calculated by minimizing an equation $\|X-HSH^{T}\|_{F}^{2}+\alpha\mathrm{Tr}(H^{T}CH)$, wherein:
   X is a nonnegative symmetric graph matrix formulated using the synonym score;
   H is a matrix comprising the sentiment scores;
   S is a modifier to allow H to be closer to a form of cluster indicators;
   $\alpha$ is an input parameter;
   C is a constraint weight matrix formulated using the antonym score; and
   $\|\ \|_{F}$ indicates a Frobenius norm.

7. The method of claim 1, further comprising:
   classifying each adjective of the set of data as either a positive word or a negative word.

8. The method of claim 1, wherein the set of data is social media data.

9. The method of claim 1, further comprising:
   determining a sentiment score for at least part of the set of data.

10. A system for processing data, comprising:
    an interface to a storage device configured to store a set of data; and
    a processor, communicating with the storage device via the interface, the processor being configured to:
      identify a set of seed words comprising words defined as either positive words or negative words;
      extract, from the set of data, adjectives linked to the set of seed words with "and";
      extract, from the set of data, adjectives linked to the set of seed words with "but";
      determine a first value indicating a first frequency with which the adjectives are linked to the set of seed words with "and";
      determine a second value indicating a second frequency with which the adjectives are linked to the set of seed words with "but";
      calculate a synonym score using an equation $x_{ij}=w_{ij}^{+}+\mathrm{Log}(d_{ij}^{+}+1)$, wherein $x_{ij}$ corresponds to the synonym score, $w_{ij}^{+}$ corresponds to a number of times that a word i and a word j appear to be synonyms, and $d_{ij}^{+}$ corresponds to the first frequency; and
      calculate, by a processor, sentiment scores for each adjective of the set of data based on the synonym score and an antonym score calculated using the second value.

11. The system of claim 10, wherein identifying the set of seed words comprises:
    identifying the set of seed words; and
    generating an expanded set of seed words by adding synonyms and antonyms of the set of seed words to the set of seed words.

12. The system of claim 10, wherein the set of seed words comprises a positive set and a negative set.

13. The system of claim 10, wherein each of the sentiment scores comprises a positive sentiment score and a negative sentiment score.

14. The system of claim 10, wherein the processor is further configured to calculate the antonym score using an equation $c_{ij}=I_{ij}+\mathrm{Log}(d_{ij}^{-}+1)$, wherein $c_{ij}$ corresponds to the antonym score, $I_{ij}$ equals 1 if the word i is in a positive set of the set of seed words and the word j is in a negative set of the set of seed words, or vice versa, and equals 0 otherwise, and $d_{ij}^{-}$ corresponds to the second frequency.

15. The system of claim 14, wherein the sentiment scores can be calculated by minimizing an equation $\|X-HSH^{T}\|_{F}^{2}+\alpha\mathrm{Tr}(H^{T}CH)$, wherein:
    X is a nonnegative symmetric graph matrix formulated using the synonym score;
    H is a matrix comprising the sentiment scores;
    S is a modifier to allow H to be closer to a form of cluster indicators;
    $\alpha$ is an input parameter;

C is a constraint weight matrix formulated using the antonym score; and $\| \|_F$ indicates a Frobenius norm.

16. The system of claim 10, wherein the processor is further configured to:

classify each adjective of the set of data as either a positive word or a negative word.

17. The system of claim 10, wherein the set of data is social media data.

18. The system of claim 10, wherein the processor is further configured to:

determine a sentiment score for at least part of the set of data.

19. The method of claim 1, wherein:

the sentiment scores are calculated using graph matrixes; and the synonym score and the antonym score indicate graph edge weights.

20. The system of claim 10, wherein:

the sentiment scores are calculated using graph matrixes; and the synonym score and the antonym score indicate graph edge weights.

* * * * *